United States Patent
Braun

(10) Patent No.: US 9,566,684 B2
(45) Date of Patent: Feb. 14, 2017

(54) MACHINE TOOL

(71) Applicant: HAAS Schleifmaschinen GmbH, Trossingen (DE)

(72) Inventor: Hans-Dieter Braun, Frittlingen (DE)

(73) Assignee: HAAS Schleifmaschinen GmbH, Trossingen (DE)

( * ) Notice: Subject to any disclaimer, the term of this patent is extended or adjusted under 35 U.S.C. 154(b) by 185 days.

(21) Appl. No.: 14/636,501

(22) Filed: Mar. 3, 2015

(65) Prior Publication Data

US 2015/0251290 A1    Sep. 10, 2015

(30) Foreign Application Priority Data

Mar. 5, 2014    (DE) .......................... 10 2014 102 938

(51) Int. Cl.
*B24B 27/00*    (2006.01)
*B23Q 3/157*    (2006.01)
(Continued)

(52) U.S. Cl.
CPC ........... *B24B 27/0061* (2013.01); *B23Q 1/012* (2013.01); *B23Q 3/15706* (2013.01);
(Continued)

(58) Field of Classification Search
CPC ............. B23Q 3/15706; B23Q 3/15733; Y10T 483/1702; Y10T 483/1705; Y10T 483/174; Y10T 483/179; Y10T 483/1793; Y10T 483/1795; Y10T 483/1873; Y10T 483/1882
(Continued)

(56) References Cited

U.S. PATENT DOCUMENTS 4,621,407 A * 11/1986 Suzuki ................... B23Q 1/015
                                                                29/26 A
7,462,144 B2 * 12/2008 Braun ................ B23Q 3/15706
                                                                483/23
(Continued)

FOREIGN PATENT DOCUMENTS

DE    EP 0712682 A2 *    5/1996    ............. B23Q 1/015
DE    100 29 967 A1    1/2002
(Continued)

OTHER PUBLICATIONS

Search report issued in related European patent application 15157309.4, issued Jul. 24, 2015.
(Continued)

*Primary Examiner* — Sunil K Singh
*Assistant Examiner* — Michael Vitale
(74) *Attorney, Agent, or Firm* — Juneau & Mitchell

(57) ABSTRACT

A sanding machine, with a machine bed, two vertical supports arranged laterally at the machine bed, with a bridge displaceable on the vertical supports in a horizontal, linear Y-axis, with an X-sled displaceable at the bridge in a horizontal, linear X-axis, with a Z-sled displaceable at the X-sled in a vertical, linear Z-axis, with an operating spindle supported at the Z-sled, particularly a sanding spindle, with a machine table and a magazine wheel comprising tool holders for sanding disks, and which is rotational about an axis parallel in reference to the Z-axis, with the operating spindle being able to remove a tool from a tool holder and place it there when this tool holder is rotated into an exchange position, with the tool magazine being arranged underneath the machine table and in the area of the exchange position.

9 Claims, 15 Drawing Sheets

(51) Int. Cl.
  *B23Q 1/01* (2006.01)
  *B24B 3/34* (2006.01)
  *B24B 5/02* (2006.01)
  *B24B 7/00* (2006.01)
(52) U.S. Cl.
  CPC ............ *B23Q 3/15733* (2013.01); *B24B 3/34* (2013.01); *B24B 5/02* (2013.01); *B24B 7/005* (2013.01); *Y10T 483/174* (2015.01); *Y10T 483/1705* (2015.01); *Y10T 483/1795* (2015.01); *Y10T 483/1882* (2015.01)
(58) Field of Classification Search
  USPC ................ 483/17, 18, 33, 54, 55, 56, 66, 67
  See application file for complete search history.

(56) References Cited

U.S. PATENT DOCUMENTS

| | | | |
|---|---|---|---|
| 8,376,921 B2* | 2/2013 | Wember | B23Q 1/625 211/1.53 |
| 2002/0006764 A1* | 1/2002 | Hanisch | B23Q 1/52 451/1 |
| 2007/0212977 A1* | 9/2007 | Braun | B23Q 1/012 451/5 |
| 2010/0202848 A1* | 8/2010 | Tanizaki | B23Q 1/015 409/134 |
| 2010/0313718 A1* | 12/2010 | Meidar | B23Q 1/012 82/122 |

FOREIGN PATENT DOCUMENTS

| | | |
|---|---|---|
| EP | 0 186 726 A1 | 7/1986 |
| EP | 0 611 630 B1 | 8/1994 |
| EP | 2 263 827 B1 | 12/2010 |
| EP | 1 886 762 B1 | 9/2015 |
| JP | 2014012307 A * | 1/2014 |
| SU | 1 151 413 A1 | 4/1985 |
| WO | WO 93/16841 | 9/1993 |

OTHER PUBLICATIONS

German Office Action for related German patent application 10 2014 102 938.0, issued Dec. 1, 2014.

* cited by examiner

MACHINE TOOL

CROSS REFERENCE TO RELATED APPLICATIONS

This patent application claims priority to German Patent Application 10 2014 102 938.0, filed on Mar. 5, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a sanding machine.

Background of the Invention

A processing machine, particularly a sander in the Gantry design, shows two vertical supports, arranged laterally at the machine bed, on which a bridge can be displaced in a first horizontal, linear axis, numerically controlled. A sled, numerically controlled, is displaceable at this bridge in a second horizontal axis, orthogonal in reference to the first axis. Another sled is supported in a vertical third linear axis, orthogonal in reference to the other two axes. For a simpler reference, in the description and in the claims the first horizontal linear axis is called the Y-Axis, the second horizontal linear axis is called the X-Axis, and the vertical linear axis is called the Z-axis. The sled displaceable in the second horizontal linear axis is called the X-sled and the sled displaceable in the vertical linear axis is called the Z-sled. An operating spindle is supported at the Z-sled. A machine table is arranged on the machine bed, which carries a tool clamping device for clamping the work piece to be processed.

In the description and the drawings the processing machine is shown and identified as a sander and accordingly the operating spindle is a sanding spindle. The invention is how-ever also suitable for other processing machines, for example for milling machines, processing centers, and the like.

It is known from EP 1 886 762 B1 to equip a grinder with a tool magazine, which is embodied as a wheel and shows tool holders at its circumference for an exchangeable accepting of tools. This tool magazine is arranged next to the operating area of the sander, rotational about a vertical axis, parallel in reference to a Z-axis. By the numerically controlled rotation of the tool magazine, a selected tool holder can be respectively rotated into an exchange position, in which the tool holder is located in the operating area of the sander such that the sanding spindle can be moved to the tool holder located in the exchange position, in order to remove a tool from this tool holder or to place a tool into said tool holder.

The arrangement of the tool magazine embodied as a wheel next to the operating area of the sander increases the floor space necessary for the sander. In order to prevent the tool magazine from hindering the processing in the operating area, the wheel of the tool magazine shows a clear sector, which is made to coincide with the space of the operating area, when the processing of the work piece occurs. This clear sector limits the number of tool holders and thus the intake capacity of the tool magazine.

A sander in the Gantry design is known from EP 0 611 630 B1, in which at a horizontal bridge a first sled can be dis-placed horizontally in a linear axis. A Z-sled is displaceable at this sled in a vertical Z-axis, which carries a sanding spindle. A machine table rests on the machine bed, which carries a tool clamping device. The machine table is displaceable in a second horizontal, linear axis and rotational about a C-axis parallel in reference to the Z-axis. Additionally, the tool clamping device is rotational about a horizontal axis. A tool magazine is not provided.

The invention is based on the objective to provide a processing machine, particularly a sander, with a tool magazine being designed such that a floor space as small as possible is required.

This objective is attained according to the invention in a processing machine, particularly a sander, as described herein.

BRIEF SUMMARY OF THE INVENTION

In a preferred embodiment, a processing machine, comprising: a machine bed, with two vertical supports arranged laterally at the machine bed, with a bridge displaceable on the vertical supports in a horizontal, linear Y-axis, with an X-sled displaceable at the bridge in a horizontal, linear X-axis, with a Z-sled displaceable at the X-sled in a vertical, linear Z-axis, with an operating spindle supported at the Z-sled, particularly a sanding spindle, with a machine table arranged on the machine bed, which carries a work piece clamping device, and with a tool magazine, which is embodied as a magazine wheel, comprising at its circumference tool holders for an exchangeable accepting of tools, particularly sanding disks, and which is rotational about an axis parallel in reference to the Z-axis, with the operating spindle being able to remove a tool from a tool holder and place it there, when this tool holder is rotated into an exchange position, characterized in that the tool magazine is arranged underneath the machine table and in the area of the exchange position projects laterally beyond the machine table such that the operating spindle can be displaced next to the machine table towards the bottom to the tool holder located respectively in the exchange position.

In another preferred embodiment, the processing machine as described herein, wherein the machine table is rotational on the machine bed about a vertical C-axis parallel in reference to the Z-axis.

In another preferred embodiment, the processing machine as described herein, wherein the operating spindle is supported and aligned in the direction of the Y-axis, fixed at the Z-sled.

In another preferred embodiment, the processing machine as described herein, wherein that the tool magazine is rotational coaxially in reference to the C-axis of the machine table.

In another preferred embodiment, the processing machine as described herein, wherein the tool magazine can be positioned in a controlled fashion optionally at the machine bed in a torque-proof fashion or coupled to the rotary drive of the machine table about the C-axis.

In another preferred embodiment, the processing machine as described herein, wherein the work piece clamping device comprises a drive, by which a work piece can be rotated about a horizontal A-axis.

In another preferred embodiment, the processing machine as described herein, wherein the tool magazine projects beyond the machine table respectively with at least one tool holder at the back in the exchange position and at the front for retooling.

In another preferred embodiment, the processing machine as described herein, wherein the machine is a sanding machine.

DETAILED DESCRIPTION OF THE INVENTION

Figure 1:
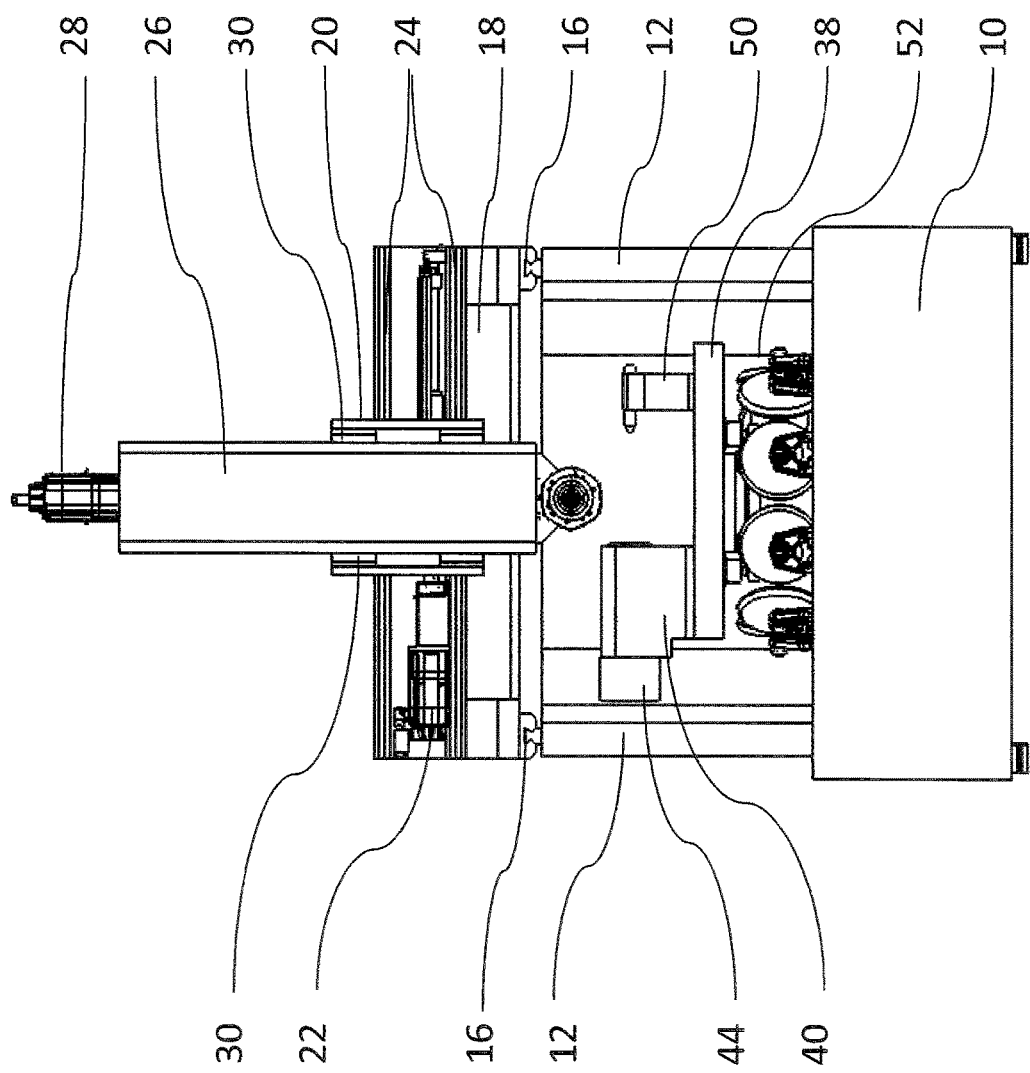
FIG. 1 is a line drawing evidencing a front view of a sander according to the in-vention.
Figure 2:
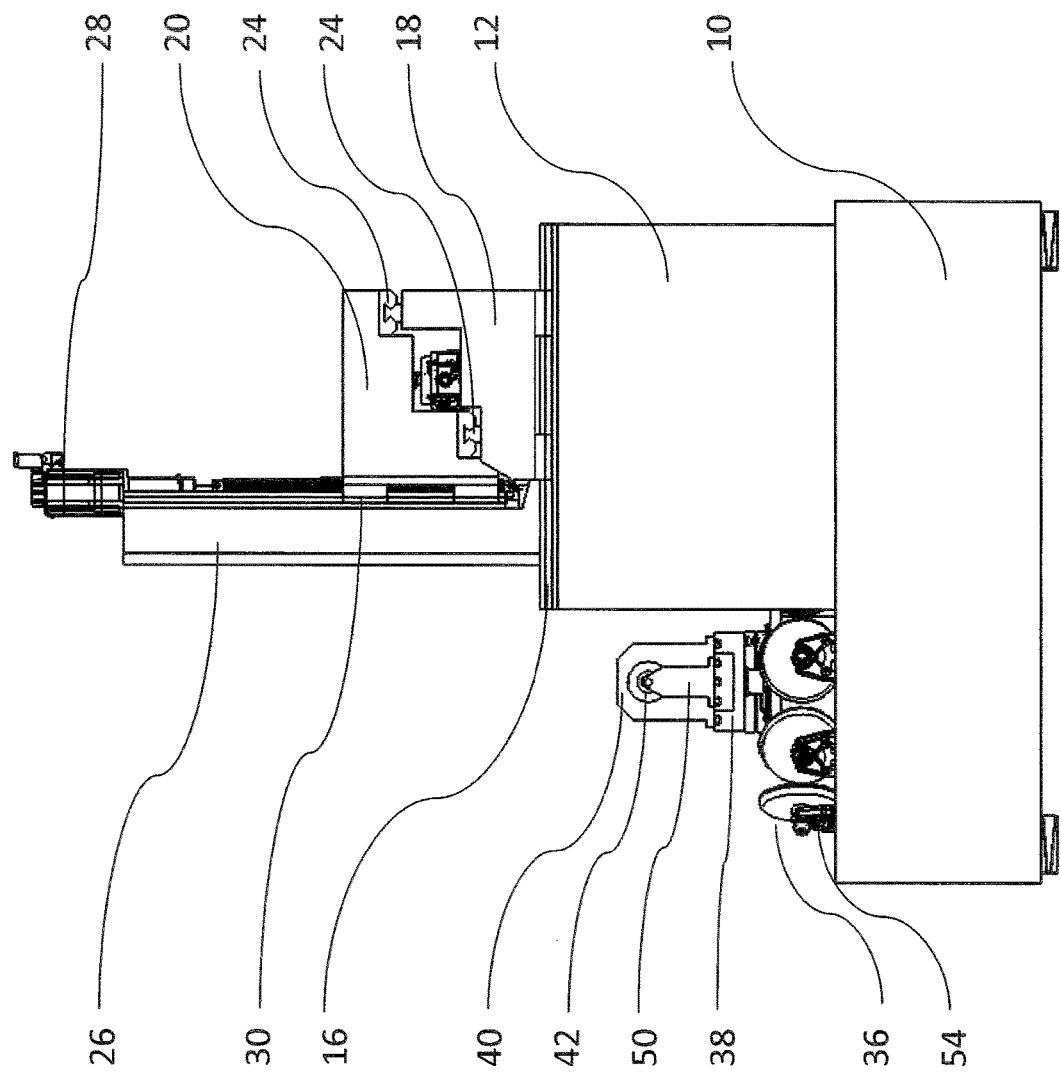
FIG. 2 is a line drawing evidencing a side view of the sander.

The essential concept of the invention comprises arranging the tool magazine, embodied as a magazine wheel, underneath the machine table. This way, the tool magazine requires no additional floor space. The floor space required of the sander is no greater than that of a sander without a tool magazine. The tool magazine is accessible for the exchange of tools, because it projects with its exchange position laterally beyond the machine table. This way, the sanding spindle can travel in the Z-axis past the machine table to-wards the bottom into the tool holder located respectively in the exchange position, in order to insert a tool or to accept one therefrom.

In an advantageous embodiment the machine table carrying the tool clamping device is rotational about the vertical C-axis. This allows the pivoting of the work piece clamped to the machine table in reference to the tool, preferably a sanding disk, clamped in the sanding spindle, in order to perform a four-axial sanding. In this embodiment it is not required for the sanding spindle to be pivoted about the C-axis and thus it can be arranged fixed at the Z-sled. The axis of the sanding spindle is here preferably aligned in the Y-axis such that it is located between the vertical sup-ports and parallel in reference thereto. The drive of the sanding spindle and their tool clamping unit determines the axial dimension of the sanding spindle, however the clear internal distance of the lateral supports can be selected independent from the axial dimension of the sanding spindle because it is not pivoted about the C-axis. This allows a reduced width of the sander and thus the floor space required.

A particularly compact embodiment is possible by the fact that the tool magazine is rotational, coaxial with the C-axis of the machine table. This coaxial embodiment addition-ally allows a particularly advantageous, simple rotary drive of the tool magazine. The tool magazine can be coupled in a controlled fashion to the drive of the C-axis of the machine table so that no additional drive is required for the tool magazine.

In an advantageous embodiment the work piece clamping device arranged on the machine table is numerically controlled and rotational such that the clamped work piece can be rotated about its axis. This results in an additional axis of rotation, the A-axis, so that a five-axial sanding is possible.

In an advantageous fashion the machine table is embodied with two parallel lateral edges, i.e. essentially in a rectangular fashion. The magazine wheel of the tool magazine projects with its circumference laterally beyond the machine table at both lateral edges. When the machine table is aligned with its two parallel lateral edges in the X-axis, the Z-sled can access the tool magazine with the sanding spindle, passing the rear lateral edge facing away from the operator. At the front, the tool magazine is simultaneously accessible for the operator, so that any loading and retooling of the tool magazine is possible from the front. Additionally, the machine table can be rotated about the C-axis such that the drive and the clamping means of the tool clamping device face the front side and thus the operator. The tool clamping device can therefore also be operated from the front. Due to the fact that all operating measures can be performed from the front it is possible to place several sanders side-by-side without gaps between them. This results in a particularly effective reduction of the required floor space.

DETAILED DESCRIPTION OF THE FIGURES

The sander comprises a machine bed 10, on which at both sides respectively a vertical support 12 is arranged. The supports 12 may be connected to each other at the rear by a rear wall 14. A linear guide 16 is arranged respectively on the upper edges of the supports 12, extending horizontally and vertically in reference to the front of the sander in the Y-axis. A bridge 18 rests with its two ends respectively on the sup-ports 12 and is numerically controlled displaceable in the Y-axis on the Y-guides 16. An X-sled 20 is displaceable, numerically controlled, on the bridge 18 in the X-axis, parallel in reference to the front of the sander, via a drive 22 on X-guides 24. A Z-sled 26 is supported at the X-sled 20, which can be displaced numerically controlled in a Z-axis, perpendicular in reference to the Y-axis and the X-axis, via a Z-drive 28 in Z-guides 30 of the X-sled 20. An operating spindle is arranged at the bottom of the Z-sled 26, called sanding spindle 32. The sanding spindle 32 is arranged at the Z-sled 26 with its axis being aligned horizontally in the Y-direction. The sanding spindle 32 comprises a rotary drive and a chuck 34 at its front end for a tool, particularly a sanding disk 36.

A horizontal machine table 38 is arranged on the machine bed 10. The machine table 38 shows essentially the form of a rectangular plate and is rotational, in a manner explained in detail in the following, about a vertical C-axis arranged centrally in reference to the supports 12. A tool clamping device 40 is arranged on the machine table 38. The tool clamping device 40 shows a horizontal A-axis 42, which is rotational, numerically controlled via an A-drive 44. The A-axis 42 comprises clamping means 46 for a work piece 48 to be processed. Additionally, the machine table 38 may also show counter bearings 50 for supporting the free end of the work piece 48.

Figure 4:
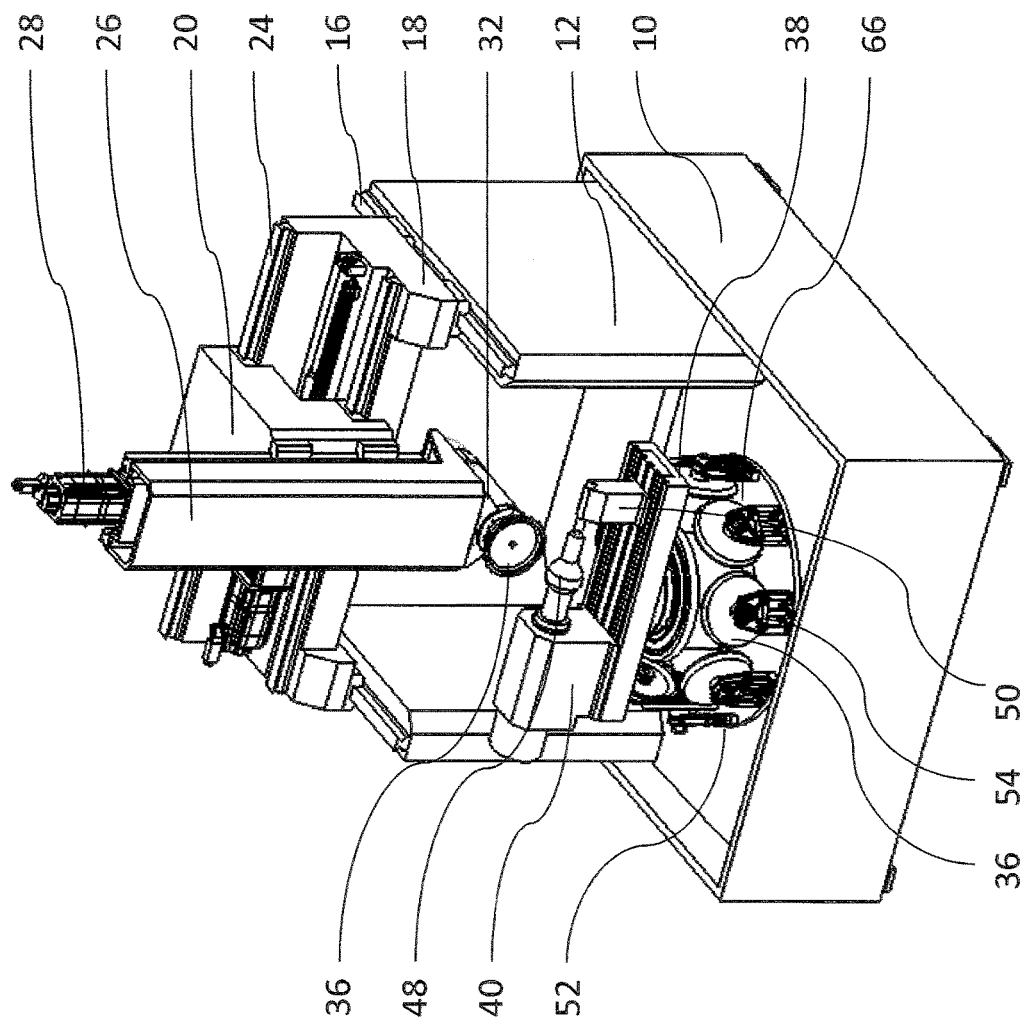
FIG. 4 is a line drawing evidencing a perspective view of the sander with a work piece clamped thereat, with the work piece being aligned in the X-axis.
Figure 5:
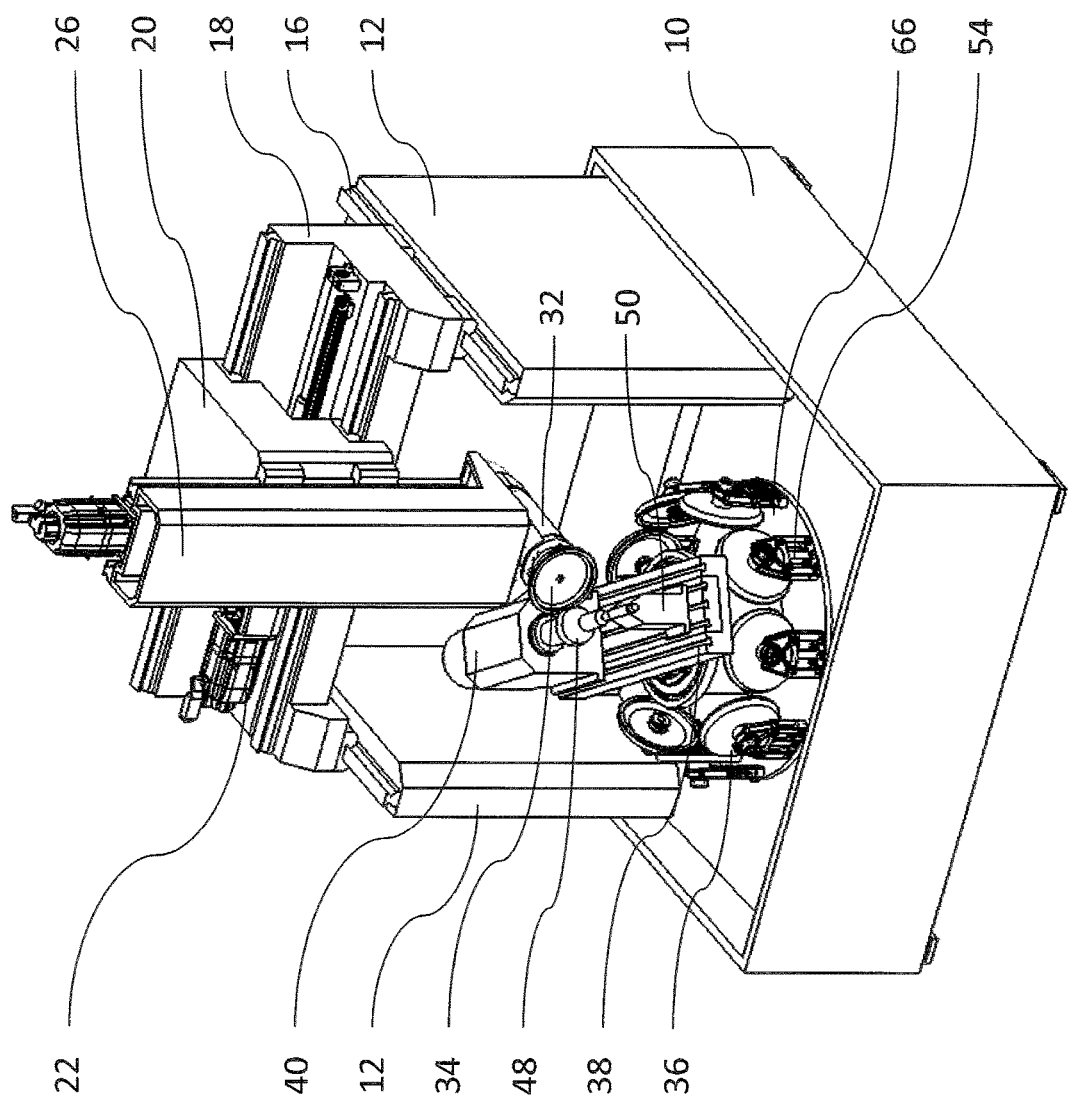
FIG. 5 is a line drawing evidencing a respective view, with the axis of the work piece being pivoted about the C-axis into an end position of the pivoting range.
Figure 6:
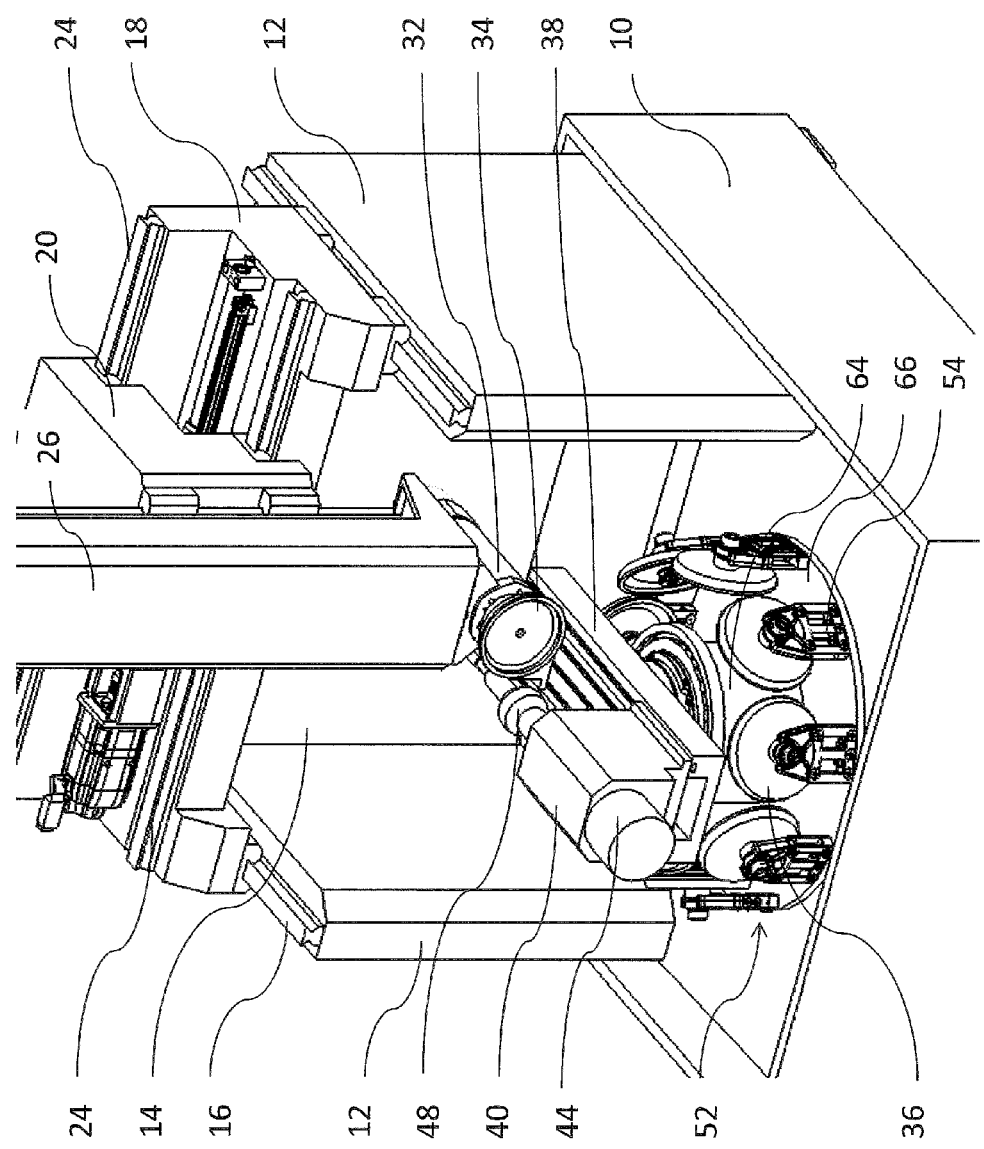
FIG. 6 is a line drawing evidencing a respective illustration, with the axis of the work piece being aligned in the Y-axis.
Figure 7:
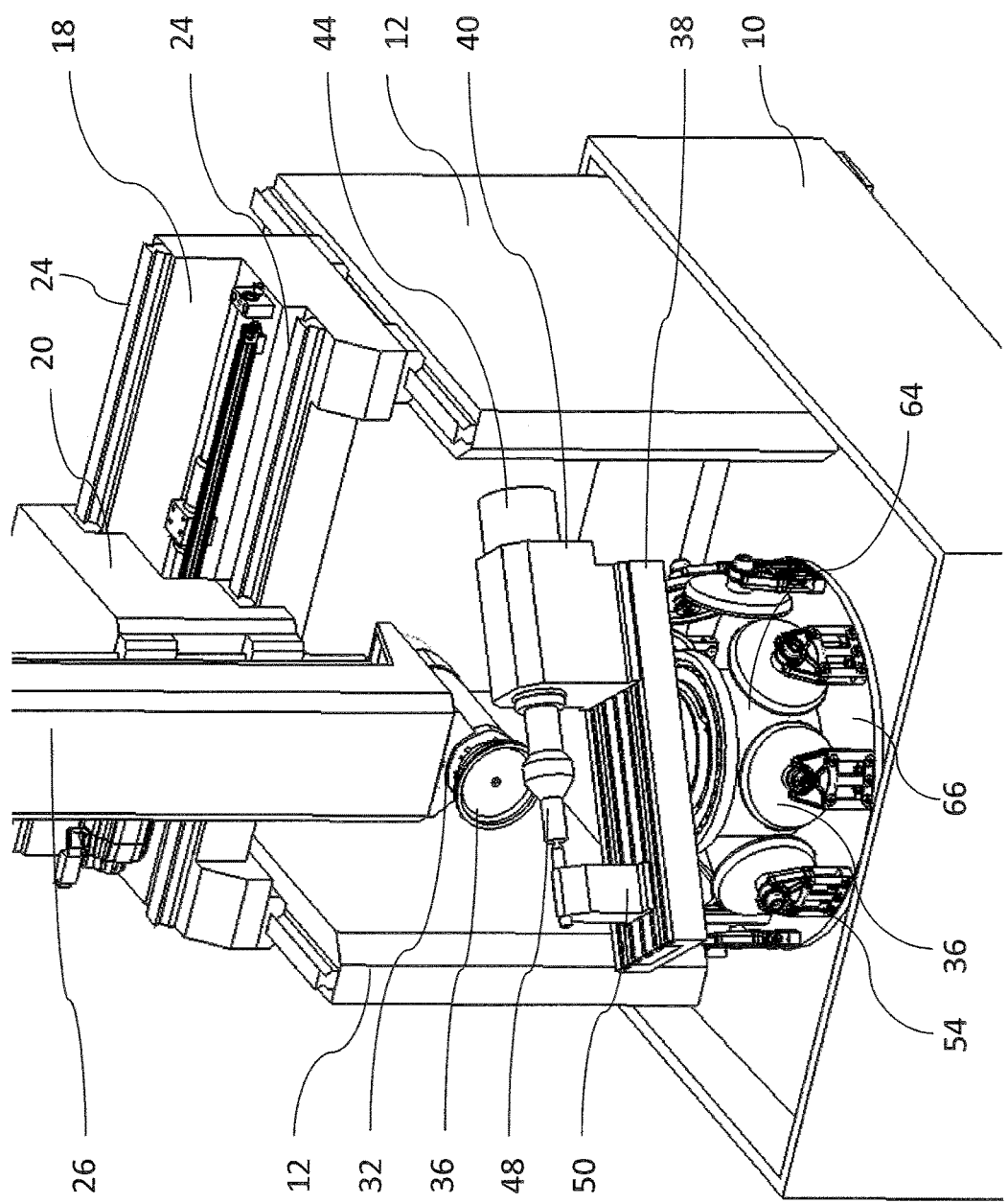
FIG. 7 is a line drawing evidencing a respective illustration, with the axis of the work piece being pivoted about the C-axis into another end position of the pivotal movement.

As illustrated in FIGS. 4 to 7, via the sander shows a five-axial sanding of a work piece 48 is possible. When the A-axis 42 with the work piece 48 is aligned in the X-axis, as shown in FIG. 4, circumferential areas of the work piece 48 can be sanded by moving the sanding disk 36 in the three linear axes and by rotating the work piece 48 about the A-axis 42. By pivoting the machine table 38 about the C-axis surfaces of the work piece 48 can be sanded, which are inclined in reference to the axis of the work piece. Here, a pivoting of the machine table 38 is possible from the end position shown in FIG. 5 to another end position shown in FIG. 7, in order to generate desired conical areas of the work piece 48. When the machine table 38 is pivoted about the C-axis into the position shown in FIG. 6, in which the A-axis 42 is aligned in the Y-direction, work piece surfaces can be sanded which are perpendicular in reference to the axis of the work piece 48. By the ability to pivot the ma-chine table 38 into the end positions of FIGS. 5 and 7 it is possible to sand diagonal areas of the work piece 48 in both axial directions, and for this purpose the sanding disk 36 only needs to be displaced in the Y-axis to the central axis of the work piece 48. The short displacement path promotes the stiffness and stability.

In an advantageous embodiment, not shown in the drawing, a truing unit is additionally arranged on the machine table 38 next to the work piece clamping device 40. The rotary axis of the truing unit is arranged horizontal and parallel in reference to the A-axis 42. A sanding disk 36 to be aligned is clamped to the sanding spindle 32 and can be moved in three linear axes X, Y, and Z towards the truing unit. By rotating the sanding disk 36 about the sanding spindle 32 and by pivoting the machine table 38 with the truing unit about the vertical C-axis, as shown in FIGS. 4 to 7, the sanding disk 36 can be completely aligned at its entire circumference and in its circumferential contour (Crossdressing).

A tool magazine 52 is arranged underneath the machine table 38. The tool magazine 52 shows the form of a wheel, which is arranged coaxially in reference to the vertical C-axis of the machine table 38 and rotational about the C-axis. The tool magazine 52 carries at its perimeter tool holders 54, in which tools can be inserted and/or removed from the top, for example sanding disks 36. The shaft of the tools is here aligned radially outwardly.

Figure 10:
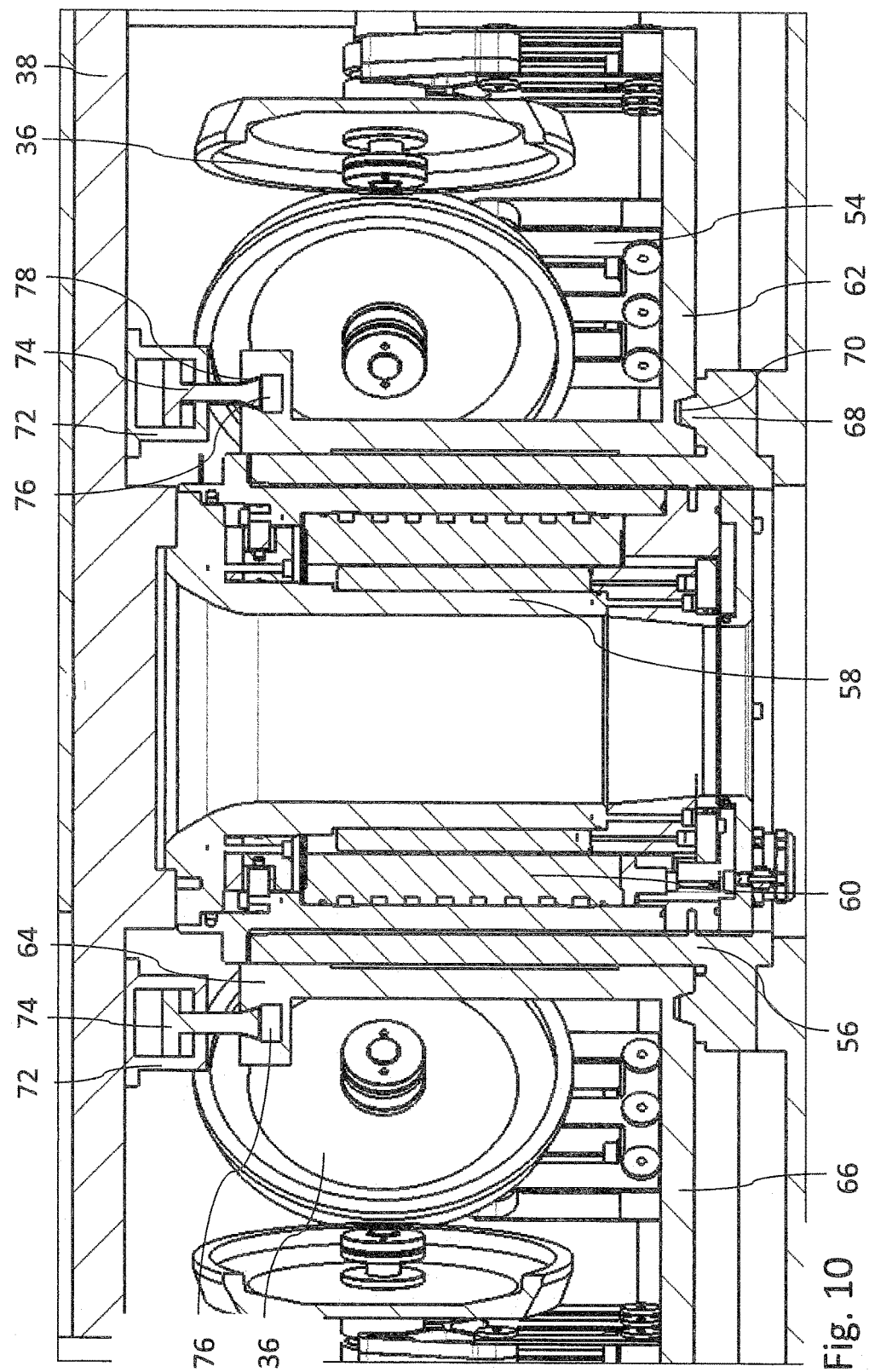
FIG. 10 is a line drawing evidencing an axial cross section according to FIG. 9, with the tool magazine being positioned indexed at the machine table and the index tap-pet being approached.
Figure 11:
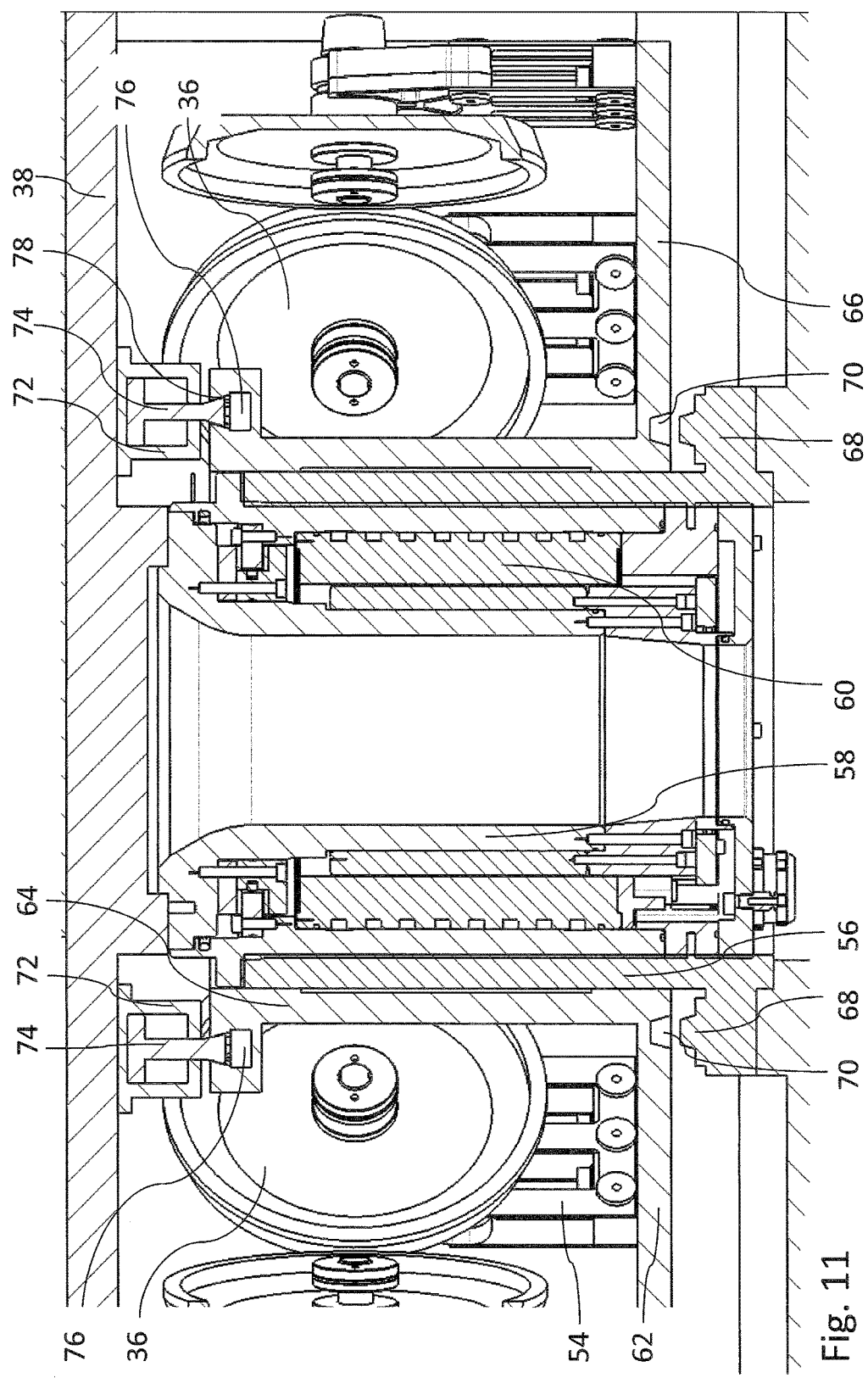
FIG. 11 is a line drawing evidencing an axial cross section according to FIG. 9, with the tool magazine being lifted off and coupled to the machine table in a torque-proof fashion.

The design and functionality of the C-axis of the machine table 38 and the tool magazine 52 are explained in the following based on an exemplary embodiment using the FIGS. 9 to 11.

A C-housing 56 is mounted fixed on the machine bed 10. The C-housing 56 shows the form of a hollow cylinder, projecting vertically upwards from the machine bed 10, which is open towards the top. From the top, a cylindrical C-axial body 58 is inserted coaxially in the C-housing 56. The C-axial body 58 is supported rotationally in the C-housing 56 and can be rotated numerically controlled via a C-drive motor 60, inserted fixed in the C-housing 56 and coaxially encompassing the C-axial body 58. The machine table 38 is fastened on top of the C-axial body 58 in a torque-proof fashion. Via the C-drive motor 60 therefore the machine table 38 can be rotated in a controlled fashion about the vertical C-axis in reference to the machine bed 10.

A magazine wheel 62 of the tool magazine 52 rests on the C-housing 56, freely rotational. The magazine wheel 62 comprises a tubular body 64 coaxially encompassing the C-housing 56 and a horizontal support disk 66 attached at the bottom end of the tubular body 64 and pointing radially outwardly. The magazine wheel 62 is guided rotationally and in a vertically, thus axially displaceable fashion via the tubular body 64 on the external circumference of the C-housing 56. On the top of the support disk 66, at its circular perimeter, the tool holders 54 are arranged with a mutual angular distance. In the exemplary embodiment shown, nine tool holders 54 are provided. The tool holders 54 are embodied such that a tool, particularly a sanding disk 36, can be inserted into the tool holder 54 with a radially and horizon-tally aligned axis and be held there. The vertical height of the C-housing 56 and the magazine wheel 62 are sized such that the tool holders 54 with the respectively inserted sanding disks 36 are located completely below the machine table 38. A freely mutual distortion of the machine table 38 and the tool magazine 52 is possible thereby.

Figure 3:
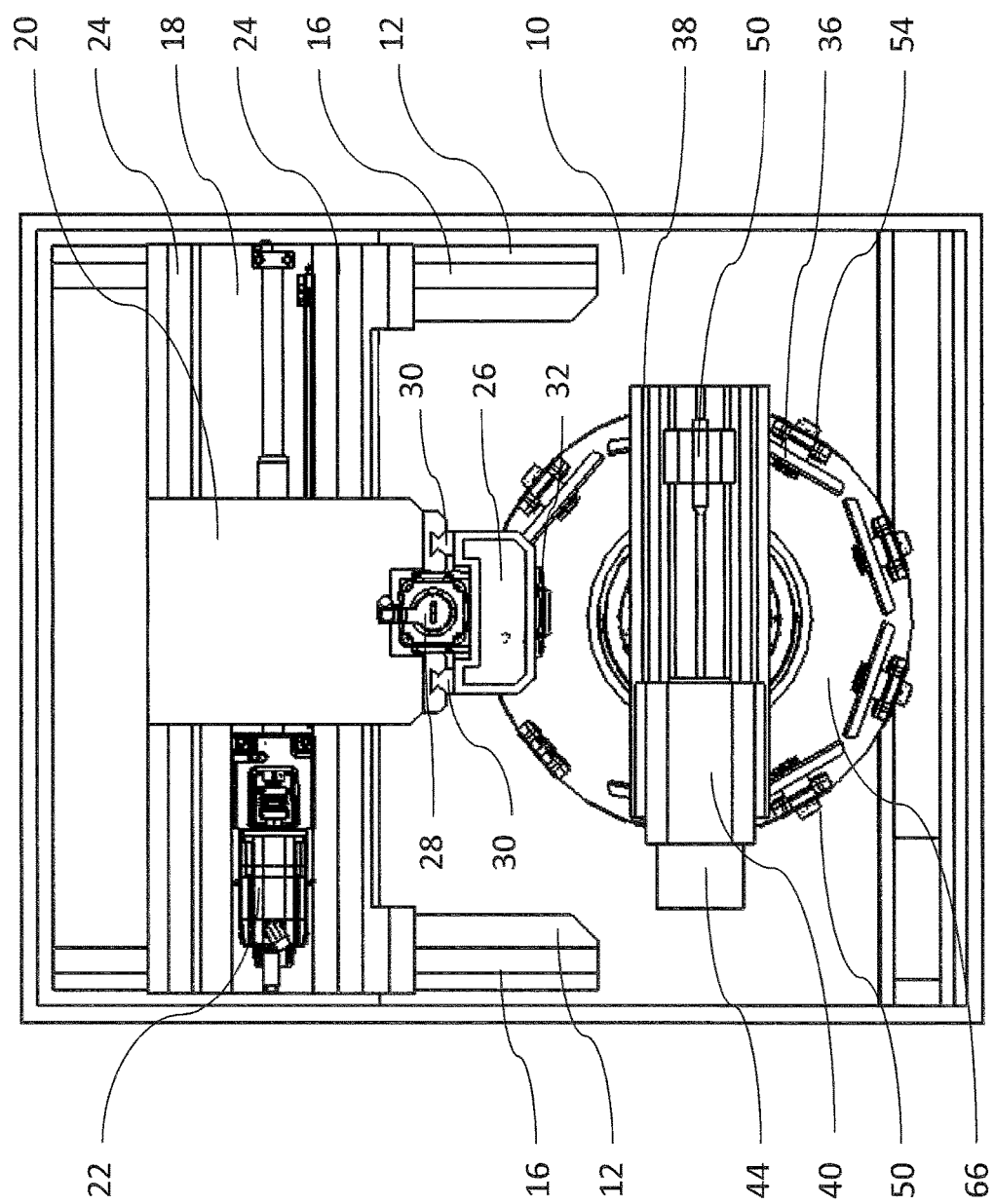
FIG. 3 is a line drawing evidencing a top view of the sander.

As most clearly discernible in FIG. 3, the exterior diameter of the support disk 66 of the tool magazine 52 is sized such that the support disk 66 respectively projects with at least one tool holder 54 completely beyond the two parallel longitudinal lateral edges of the rectangular machine table 38.

Figure 8:
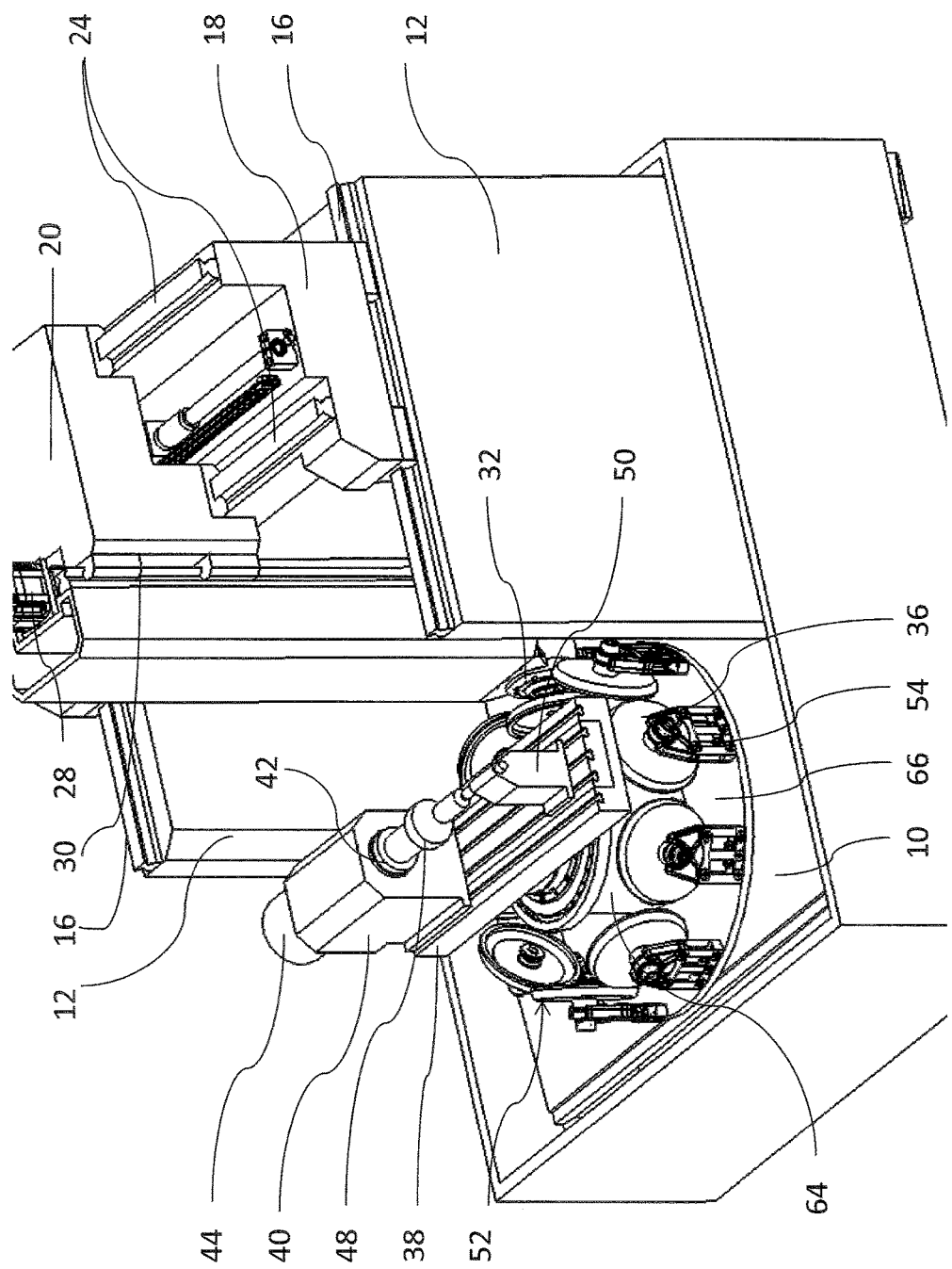
FIG. 8 is a line drawing evidencing a perspective view of the sander, with the sanding spindle being moved towards the tool exchange position of the tool magazine.

This way it is possible to bring a selected tool holder 54 into an exchange position facing away from the operator front, in which the sanding spindle 32 with the Z-sled 26 can be moved vertically behind the machine table 38 past it towards the bottom, in order to deposit a tool, for example a sanding disk 36, in the tool holder 54 in this exchange position or to remove a sanding disk 36 from this tool hold-er 54, as shown in FIG. 8. At the user front, additionally at least one tool holder 54 is accessible from the top, in front of the machine table 38, so that the tool magazine 52 can be retooled by an operator from the front. The retooling of the tool magazine 52 from the front is advantageous, be-cause this way a continuous side-by-side placement of sever-al sanders is possible.

The tool magazine 52 is protected by a cover against cool-ants and lubricants as well as against chips and sanding re-fuse. The cover is not shown in the drawing in order to al-low showing the design of the tool magazine 52. The cover is preferably dome-shaped and can be opened by displacing individual sectors in the circumferential direction for accessing the tool holders 54.

The rotary drive of the tool magazine 52 occurs advantageously by the C-drive motor 60, so that costs and space are saved. For this purpose, the tool magazine 52 can be coupled to the drive via the C-drive motor 60 in the following way, if necessary. An external collar is embodied at the C-housing 56 by conical positioning pins 68 pointing upwards. Conical positioning bores 70, arranged with the same radius and at the same angular distance at the bottom of the tubular body 64, match the positioning pins 68 distributed over the circumference of the C-housing 56 in equal angular distances. At the bottom of the machine table 38, diametrically in reference to the C-axis, two index aggregates 72 are arranged. The controlled, fluid-operated index aggregates 72 each show an index tappet 74 pointing downwards, with its clear bottom end being conically expanded. At an external collar at the top end of the tubular body 64 a T-groove 76 is embodied, open towards the top. The T-groove 76 shows, at a predetermined angular division, index bores 78 aligned to-wards the top of the external collar and tapering towards the top. The index bores 78 may for example be arranged in a mutual angular distance of 10°. The index tappets 74 of the index aggregates 72 project into this T-groove 76.

Figure 9:
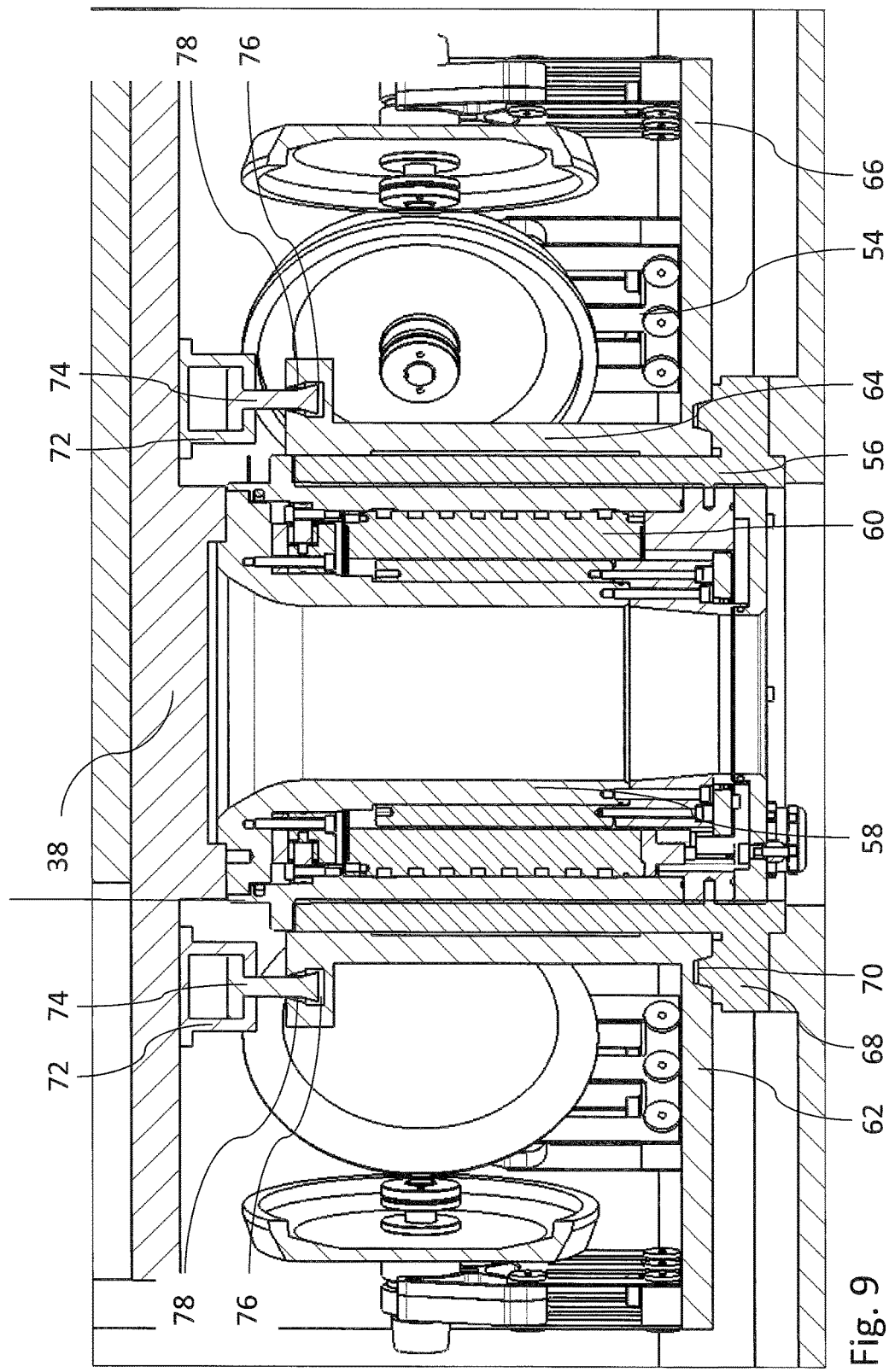
FIG. 9 is a line drawing evidencing in a vertical cross section, the drive of the C-axis and the tool magazine, with the tool magazine being coupled to the machine bed in a torque-proof fashion.

In the position shown in FIG. 9 the index tappets 74 are ex-tended into their bottom end position. The conically expanded ends of the index tappets 74 project freely into the T-groove 76, so that the index tappets 74 are not in contact with the collar of the tubular body 64. Due to its weight the magazine wheel 62 glides vertically towards the bottom so that it rests with its positioning bores 70 on the positioning pins 68 fixed at the machine. The magazine wheel 62 and thus the tool magazine 52 are therefore coupled in a torque-proof fashion via the positioning pins 68 and the positioning bores 70 to the machine bed 10. The index tappets 74 can move freely in the T-groove 76, so that the machine table 38 can be rotated in a controlled fashion, independent from the tool magazine 52, in order to allow the processing of the work piece 48 by the sanding disk 36.

When the tool magazine 52 shall be rotated, initially the machine table 38 is rotated into a position in which the index tappets 74 are located in the angular position of the index bores 78 of the T-groove 76. The index tappets 74 are pulled upwards into the index aggregate 72, so that they en-gage with their conically widening ends the conical index bores 78, as shown in FIG. 10. This way, the magazine wheel 62 is coupled in a defined angular position to the machine table 38 in a torque-proof fashion. Then the index tappets 74 of the index aggregates 72 are completely moved into their upper end position, as shown in FIG. 11. This causes the magazine wheel 62 to be pulled vertically upwards against the machine table 38, resulting in the positioning bores 70 lifting off the positioning pins 68. The magazine wheel 62 is thereby released from the C-housing 56 and the machine bed 10 and can be rotated by the C-drive motor 60 together with the machine table 38.

Figure 12:
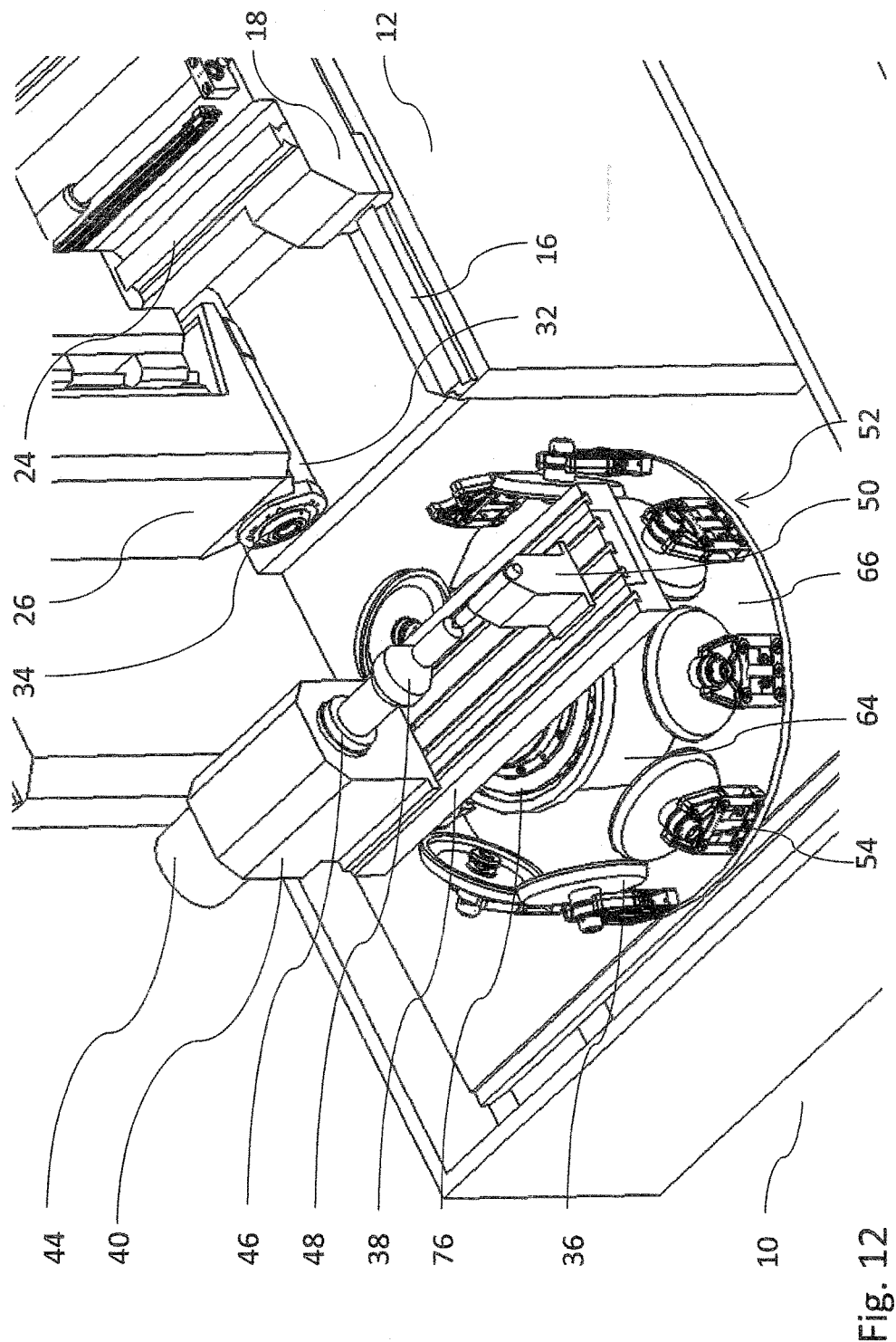
FIG. 12 is a line drawing evidencing the initial position for a tool exchange.
Figure 13:
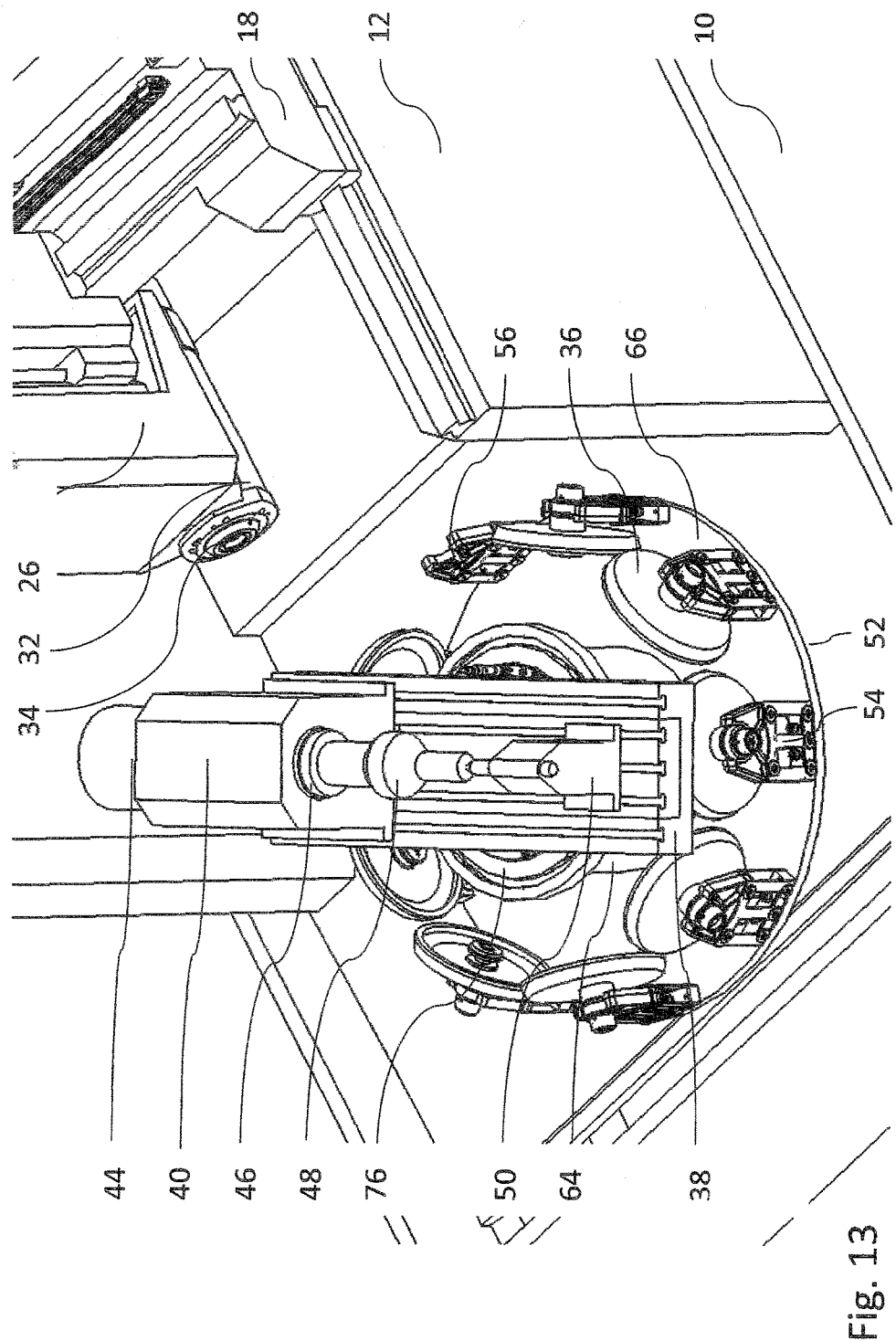
FIG. 13 is a line drawing evidencing an illustration according to FIG. 12, with the machine table being aligned to a tool holder with a tool to be exchanged.
Figure 14:
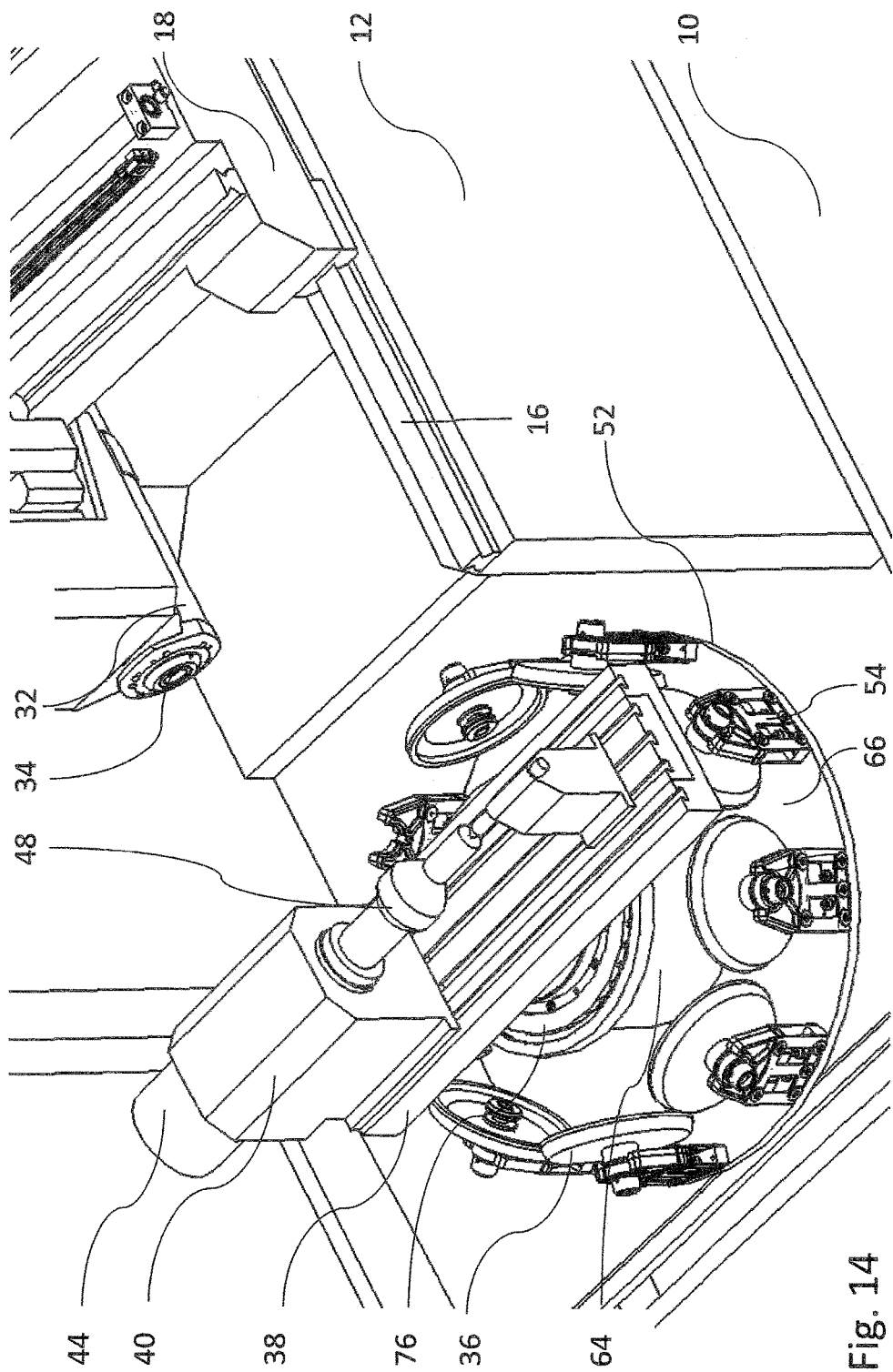
FIG. 14 is a line drawing evidencing an illustration according to FIG. 12, in which the machine table is rotated with the tool magazine such that the tool holder with the tool to be selected is located in the exchange position.
Figure 15:
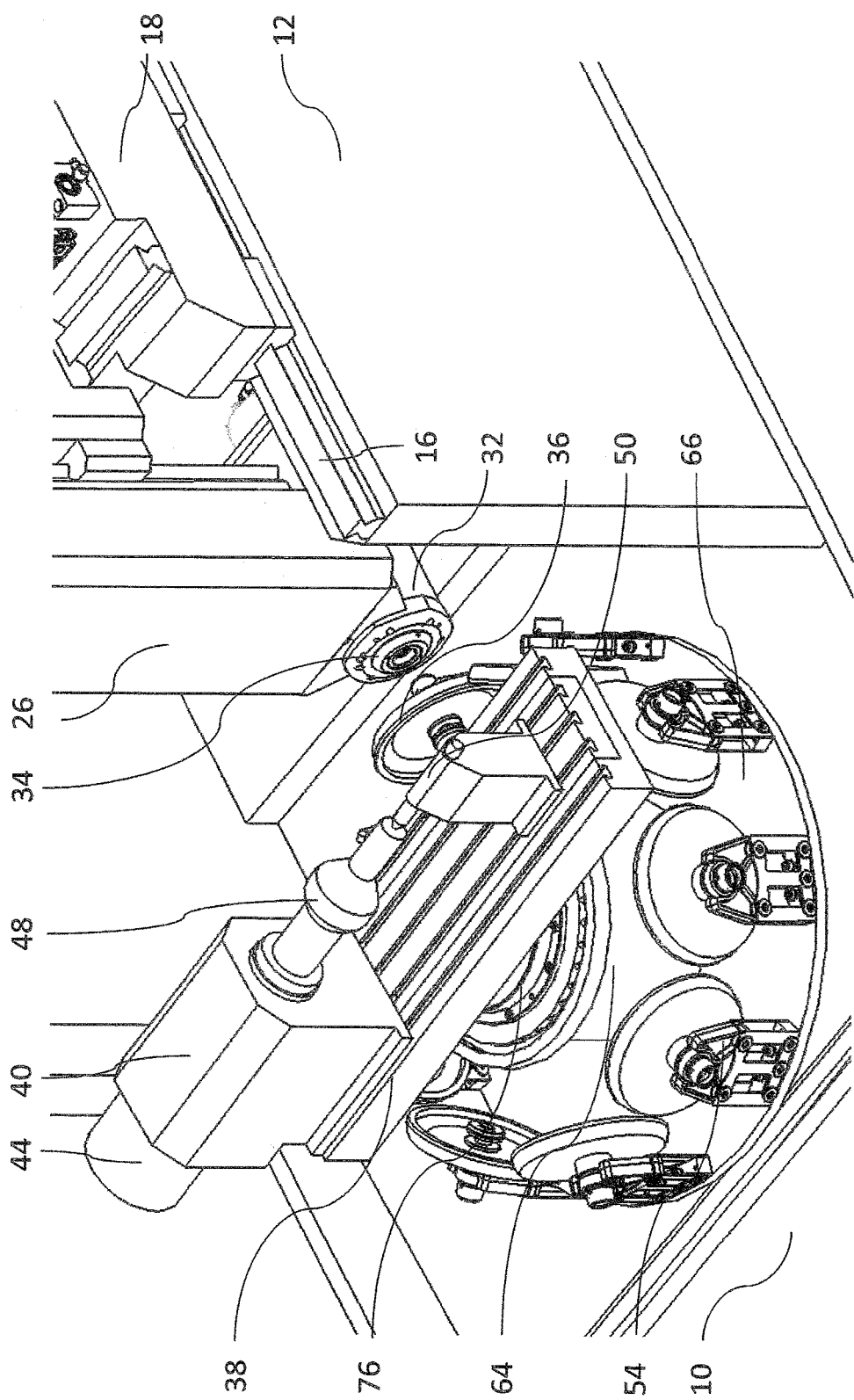
FIG. 15 is a line drawing evidencing a respective illustration, in which the sand-ing spindle is lowered in order to accept the tool in the exchange position.

For an exchange of the tool, for example a sanding disk 36, initially a tool holder 54 is rotated into the exchange position facing the Z-sled 26, as shown in FIG. 12. A sanding disk, clamped in the sanding spindle 32, can then be placed into this clear tool holder 54, as shown in FIG. 8. The sanding spindle 32 is then raised in order to release the tool magazine 52. Here, the tool magazine 52 as shown in FIG. 9 is held fixed at the machine in the position shown, while the machine table 38 is freely rotational in reference to the tool magazine 52. In order to clamp a selected different sanding disk 36, initially the machine table 38 is rotated in a controlled fashion in reference to the tool magazine 52, held fixed in reference to the machine, to such an extent until the longitudinal edges of the machine table 38 are aligned perpendicular in reference to the axis of the selected sanding disk 36, as shown in FIG. 13. In this posi-tion the index aggregates 72 are confirmed, as shown in FIGS. 10 and 11. This way, the magazine wheel 62 is lifted vertically off the positioning fixed at the machine and coupled in a torque-proof fashion with the machine table 38. Subsequently, via the C-drive motor 60 the machine table 38 is rotated together with the magazine wheel 62, coupled thereto in a torque-proof fashion, until the magazine wheel 62 with the selected sanding disk 36 is in the exchange position, as shown in FIG. 14. Now the magazine wheel 62 can be lowered again and thus positioned in a torque-proof fashion at the machine bed 10. The sanding spindle is lowered via the Z-sled 26, as shown in FIG. 15, so that the selected new sanding disk 36 can be accepted in the chuck 34 of the sanding spindle 32. The machine table 38 is now once more freely rotational in reference to the tool magazine 52, coupled fixed to the machine, so that a work piece 48 can be processed via the newly exchanged sanding disk 36.

LIST OF REFERENCE NUMBERS

10 Machine bed
12 Support
14 Rear wall
16 Y-guides
18 Bridge
20 X-sled
22 X-drive
24 X-guides
26 Z-sled
28 Z-drive
30 Z-guides
32 Sanding spindle (operating spindle)
34 Chuck
36 Sanding disk
38 Machine table
40 Work piece clamping device
42 A-axis
44 A-drive
46 Chuck
48 Work piece
50 Counter bearing
52 Tool magazine
54 Tool holders
56 C-housing
58 C-axial body
60 C-drive motor
62 Magazine wheel
64 Tubular body
66 Support disk
68 Positioning pins
70 Positioning bores
72 Index aggregates
74 Index tappets
76 T-groove
78 Index bores The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A processing machine, comprising:
a machine bed;
two vertical supports arranged on the machine bed, wherein the two vertical supports are laterally separated from one another in a direction that is transverse with respect to a vertical direction;
a bridge displaceable on the two vertical supports along a horizontal, linear Y-axis;
an X-sled displaceable on the bridge along a horizontal, linear X-axis;
a Z-sled displaceable on the X-sled along a vertical, linear Z-axis;
an operating spindle supported at the Z-sled;
a machine table arranged on the machine bed, wherein the machine table carries a work piece clamping device;
a tool magazine, which is embodied as a magazine wheel, comprising at the circumference of the magazine wheel a plurality of tool holders each for accepting a respective tool, wherein the tool magazine is rotatable about a tool magazine axis that extends parallel to the Z-axis, and
when one of the plurality of tool holders is rotated into an exchange position, the operating spindle is able to remove the respective tool from the one of the plurality of tool holders and place the respective tool back therein, and
the tool magazine is arranged directly underneath the machine table and projects laterally beyond the machine table such that the operating spindle can be displaced to a position that is lower than a position of the machine table and adjacent the one of the plurality of tool holders that is rotated into the exchange position.

2. The processing machine of claim 1, wherein the machine table is rotatable on the machine bed about a vertical C-axis that extends parallel to the Z-axis.

3. The processing machine of claim 2, wherein the operating spindle is rotatable about an operating spindle axis that extends parallel to the Y-axis.

4. The processing machine of claim 2, wherein the tool magazine axis is coaxial with the C-axis of the machine table.

5. The processing machine of claim 4, wherein the tool magazine can be positioned in a controlled fashion at the machine bed in a torque-proof fashion, or coupled to a rotary drive of the machine table for rotation about the C-axis.

6. The processing machine of claim 1, wherein the work piece clamping device comprises a drive, by which a work piece can be rotated about a horizontal A-axis.

7. The processing machine of claim 1, wherein the tool magazine projects beyond the machine table such that at least one of plurality of tool holders is disposed at a first side of the processing machine for retooling by an operator.

8. The processing machine of claim 1, wherein the processing machine is a sanding machine.

9. The processing machine of claim 8, wherein the plurality of tool holders includes a tool holder that accepts a sanding disk.

* * * * *